(12) United States Patent
Deshpande et al.

(10) Patent No.: US 7,979,597 B2
(45) Date of Patent: *Jul. 12, 2011

(54) PROGRAMMING PARALLEL I2C SLAVE DEVICES FROM A SINGLE I2C DATA STREAM

(75) Inventors: Amrita Deshpande, Chandler, AZ (US); Alma Anderson, Chandler, AZ (US); Jean-Marc Irazabal, Santa Clara, CA (US); Stephen Blozis, Morgan Hill, CA (US); Paul Boogaards, Cary, NC (US)

(73) Assignee: NXP B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/761,662

(22) Filed: Apr. 16, 2010

(65) Prior Publication Data
US 2010/0205326 A1    Aug. 12, 2010

Related U.S. Application Data

(63) Continuation of application No. 11/913,065, filed as application No. PCT/IB2006/051364 on May 1, 2006, now Pat. No. 7,711,867.

(51) Int. Cl.
*G06F 3/00* (2006.01)
(52) U.S. Cl. .................................. 710/14; 710/8; 710/71
(58) Field of Classification Search .................... None
See application file for complete search history.

(56) References Cited

U.S. PATENT DOCUMENTS

| 5,444,847 | A | 8/1995 | Iitsuka |
| 6,799,233 | B1 | 9/2004 | Deshpande et al. |
| 7,167,938 | B2 * | 1/2007 | Noda ........................ 710/110 |
| 2004/0093450 | A1 | 5/2004 | Andreas |
| 2007/0216548 | A1 | 9/2007 | Alfano et al. |
| 2008/0270654 | A1 | 10/2008 | Reberga |

OTHER PUBLICATIONS

Deshpande, A.: "Design of a Behavioural (Register Transfer Level, RTL) Model of the Inter-Integrated Circuit or I2C-Bus Master-Slave Interface," Thesis, Univ. of New Mexico 135 pgs. (May 1999).

* cited by examiner

*Primary Examiner* — Eron J Sorrell

(57) ABSTRACT

Consistent with one example embodiment, communications systems, using a serial data transfer bus having a serial data line and a clock line used to implement a communications protocol, incorporate programming of parallel slave devices concurrently using an I2C serial bus. At least two slave devices are coupled in parallel on the data transfer bus and configured to load serial data over the serial data line using the communications protocol. Each slave device includes a programmable configuration register configured to be programmed, using the communications protocol, to select one of a plurality of selectable slave device configurations. One of the selectable slave device configurations causes the at least two slave devices to load the serial data in parallel, and another of the selectable slave device configurations causes the at least two slave devices to be loaded one at a time.

23 Claims, 4 Drawing Sheets

PROGRAMMING PARALLEL I2C SLAVE DEVICES FROM A SINGLE I2C DATA STREAM

CROSS-REFERENCE TO RELATED APPLICATIONS

This application is a continuation of copending application no. 11/913,065, filed on Oct. 29, 2007, which is the national stage of international patent application no. PCT/IB2006/051364, filed on May 1, 2006, the contents of which are incorporated by reference herein.

The present invention is directed generally to communication devices and methodologies, and more particularly, to methods and arrangements for programming parallel slave devices concurrently using an I 2C serial bus.

The Inter-Integrated Circuit (I2C) bus developed by Philips Corporation allows integrated circuits to communicate directly with each other via a simple bi-directional 2-wire bus (plus power and ground). A device connects to each of the two wires on the bus, one serial data line (SDA) for the communication of data, and the other serial clock line (SCL) for the control and synchronization of the communication of data between the devices. Each device is connected in parallel to each of the other devices, and each of the bus lines, SDA and SCL, function as a wired-AND of all the lines on the bus. The output of each device is configured as an open-collector/open-drain device, and one or more pull-up resistors maintain a 'soft' logic high value on the bus while the bus is in the quiescent state. When a device desires access to the bus, the device pulls the bus to a logic low value, via the open-collector/open-drain device that is placed in a conductive state to ground potential.

Each device that is connected to an I2C bus is identifiable by an address, and can operate as either a transmitter or a receiver, or both. Data transfers are effected using a master-slave communications protocol. A master is a device that initiates a data transfer and generates the clock signals to permit the transfer; any device that is addressed is considered a slave for this transfer. The data transfer can be initiated by a master to either transmit data to the slave (herein designated as write), or to request data from the slave (herein designated as read). For example, an output device, such as a display screen, is typically not able to initiate a data transfer, and therefore would be configured to only operate as a slave device. A microprocessor, on the other hand, will typically be configured to operate as either a master or a slave, as the situation demands.

In a quiescent state, both the SDA and SCL bus lines are in the logic-high state (herein designated as high, or logic state of 1). A master initiates a data transfer by asserting a transition to a logic-low state (herein designated as low, or logic state of 0) on the SDA line while the SCL line is high; this is termed a START condition. Thereafter, the master toggles the SCL line to control the synchronization of the data transfer; data value changes occur on the SDA line when the SCL clock is low, and the state of the SDA line is considered valid only when the SCL clock is high.

Multiple STARTs can be asserted to effect a series of data transfers within the same transfer session. Generally, each data transfer requires an acknowledgement from the addressed recipient of the data transfer. To terminate the data transfer, the host asserts a low-to-high transition on the SDA line while the SCL clock is high; this is termed a STOP condition. Thereafter, any device may assume control of the bus as a master by asserting a high-to-low transition on the SDA line, as above. Note that, for ease of reference, the term assert is used herein for effecting, or attempting to effect, the specified logic state. In the example of a transition to a logic-high state, this is typically provided by a release of the bus from a forced pull-down state by the asserting device. This assertion of a logic-high state allows the aforementioned pull-up devices on the bus to bring the bus to a logic-high state, unless another device is also forcing the pull-down state.

The general format of an I2C data transfer involves signals on an SDA line and an SCL line forming the I2C bus. A START condition (S) corresponds to high-to-low transition of the signal on the SDA line while the SCL line is high. After the START, the host transmits an address, nominally seven bits, followed by a read/write-not indicator. After transmitting the address and the direction of data transfer (R/W-), the host releases the SDA line, allowing it to rise to a logic-high level. If a slave device recognizes its address, the slave device transmits an acknowledge signal (ACK) by pulling the bus low. The absence of a low signal when the host releases the SDA line, therefore, indicates a non-acknowledgement (NAK). If the address is acknowledged, via a low at SDA, the transmitting device transmits the data. If the direction of data transfer is a "read" relative to the host, then the slave device is the transmitting device; if the direction is a "write" relative to the host, then the master device is the transmitting device. The transmitting device releases control of the SDA line, and the receiving device acknowledges the receipt of the data by asserting a logic-low value on the SDA line. If the data is acknowledged, the transmitter sends additional data. This process continues until the entirety of the data is communicated, or until a transmitted data item is not-acknowledged. The master can subsequently reassert a START signal, and repeat the process above, or, can assert a STOP signal (P) to terminate this data-transfer session.

The above interface protocol can be implemented in a variety of ways. To minimize the development time for programming or designing an I2C interface, a variety of general-purpose interface schemes have been published. "Design Of A Behavioral (Register Transfer Level, RTL) Model Of The Inter-Integrated Circuit Or I2C-Bus Master-Slave Interface", Master's Thesis of Amrita Deshpande, University of New Mexico, 1999, discloses an I2C master interface and slave interface that is intended to be embodied in an I2C device, and is incorporated by reference herein. By providing a verified I2C interface, system designers need not address the details of the I2C specification and protocol. Both the master and the slave interfaces of this thesis are state-machine based. State-machine based systems and methods are further described in U.S. Pat. No. 6,799,233, which is hereby incorporated herein by reference.

Various aspects of the present invention are directed to methods and arrangements for programming parallel slave devices concurrently using an I2C serial bus in a manner that addresses and overcomes the above-mentioned issues.

Consistent with one example embodiment, communications systems, using a serial data transfer bus having a serial data line and a clock line used to implement a communications protocol, incorporate programming of parallel slave devices concurrently using an I2C serial bus. At least two slave devices are coupled in parallel on the data transfer bus and configured to load serial data over the serial data line using the communications protocol. Each slave device includes a programmable configuration register configured to be programmed, using the communications protocol, to select one of a plurality of selectable slave device configurations. One of the selectable slave device configurations causes the at least two slave devices to load the serial data in parallel, and another of the selectable slave device configurations causes the at least two slave devices to be loaded one at a time.

Consistent with another example embodiment, the present invention is directed to a method involving programming a configuration register in each slave device, using the communications protocol over the I2C serial data transfer bus, to select from two or more selectable slave device configurations. One of the two or more selectable slave device configurations causes the at least two slave devices to load data provided on the serial data transfer bus in parallel. Another of the two or more selectable slave device configurations causes the at least two slave devices to load data provided on the serial data transfer bus one at a time. Data is loaded into the at least two slave devices based on their selected configuration.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

The invention may be more completely understood in consideration of the following detailed description of various embodiments of the invention in connection with the accompanying drawings, in which.

Figure 1:
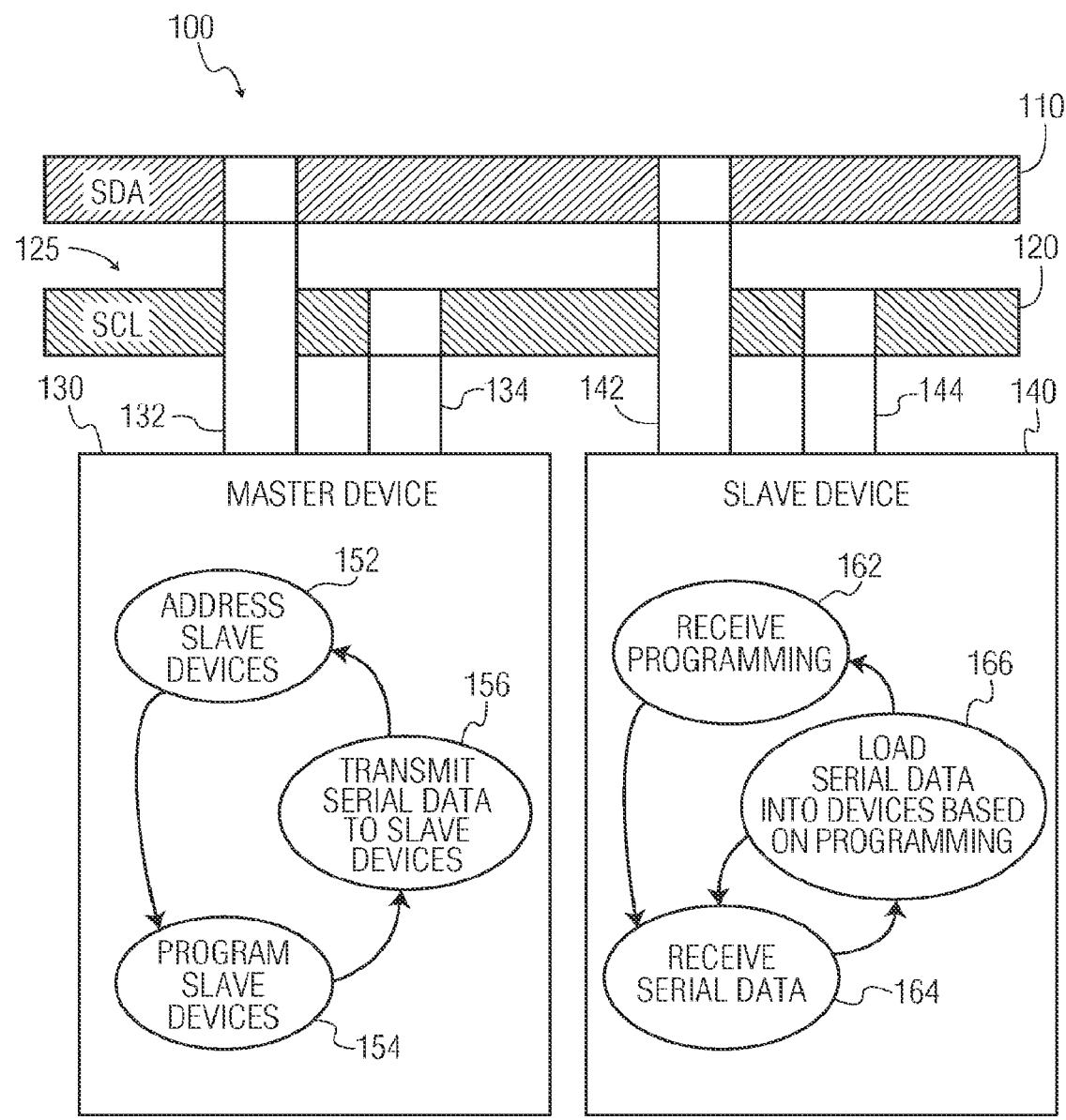
FIG. 1 is a block diagram of a data communications system implementing programming of parallel slave devices concurrently using an I2C serial bus in accordance with embodiments of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

The present invention is generally applicable to methods and arrangements for programming parallel slave devices concurrently using an I2C serial bus. The invention has been found to be particularly advantageous for Inter Integrated Circuit (I2C) serial data communications busses, but is also advantageous for other busses and communications protocols, such as system management bus (SMBus) architectures and/or protocols or other serial data communications systems. For purposes of illustration, and not of limitation, the invention will be described in the context of an I2C bus having a master device controlling communication to a slave device.

Masters control the communication with I2C slaves on the I2C bus architecture. I2C slaves find numerous applications in fields ranging from cell phones, PDAs and SmartPhones to LCD TVs, Medical Equipment, Gaming, and other applications. One particular application of an I2C slave is as a General Purpose Input/Output (GPIO) device. In this type of device, there are a number of multi-function pins that can be used as inputs or outputs. When used as inputs, these pins typically indicate the state of certain signals that are being monitored.

A particular application of an I2C slave is as a General Purpose Input/Output (GPIO). In this type of device, there are a number of multi-function pins that can be used as inputs or outputs. When configured as outputs, these devices can be used in a system for e.g. to drive many light emitting diodes (LEDs) These outputs are typically divided into banks and programmed individually via the I2C bus.

Consistent with one example embodiment, communications systems, using a serial data transfer bus having a serial data line and a clock line used to implement a communications protocol, incorporate programming of parallel slave devices concurrently using an I2C serial bus. At least two slave devices are coupled in parallel on the data transfer bus and configured to load serial data over the serial data line using the communications protocol. Each slave device includes a programmable configuration register configured to be programmed, using the communications protocol, to select one of a plurality of selectable slave device configurations. One of the selectable slave device configurations causes the at least two slave devices to load the serial data in parallel, and another of the selectable slave device configurations causes the at least two slave devices to be loaded one at a time.

Parallel slave devices that load data concurrently may be configured as general purpose Input/Output (GPIO) devices, or other slave devices. The communication system may conform to I2C, SMBus, and/or other serial communication specifications.

FIG. 1 is a block diagram of a data communications system 100 implementing programming of parallel slave devices concurrently using an I2C serial bus in accordance with embodiments of the present invention. An SDA line 110 and an SCL line 120 are arranged as an I2C data bus 125. A master device 130 and a slave device 140 are attached to the I2C data bus 125. The master device 130 is electrically connected to the I2C data bus 125 using a clock connection 134 and a data connection 132 electrically connected to the SCL line 120 and the SDA line 110 respectively.

Two or more of the slave device 140 are electrically connected to the I2C data bus 125 using a clock connection 144 and a data connection 142 electrically connected to the SCL line 120 and the SDA line 110 respectively. The master device 130 addresses 152 two or more of the slave device 140, and programs 154 the slave device 140 to operate in a particular configuration. Programming 154 of slave devices may be performed, for example, by designating an address within the slave device 140, when observed on the I2C data bus 125, configuring any slave device recognizing the designated address to receive the data following the address. All slave devices recognizing this address will subsequently receive the data placed on the bus in parallel. Due to the I2C communications protocol, the slowest slave device will control the transmission rate, such that the data will be received by all designated parallel slave devices.

The slave device 140 receives 162 the program 154, such as by placing a word in a register that designates the configuration of the slave device 140. The master device 130 transmits 156 serial data over the I2C data bus 125 to the slave device 140, which the slave device 140 receives 164. The slave device then loads 166 the serial data in paralle with any other slave devices recognizing the designated address.

Figure 2:
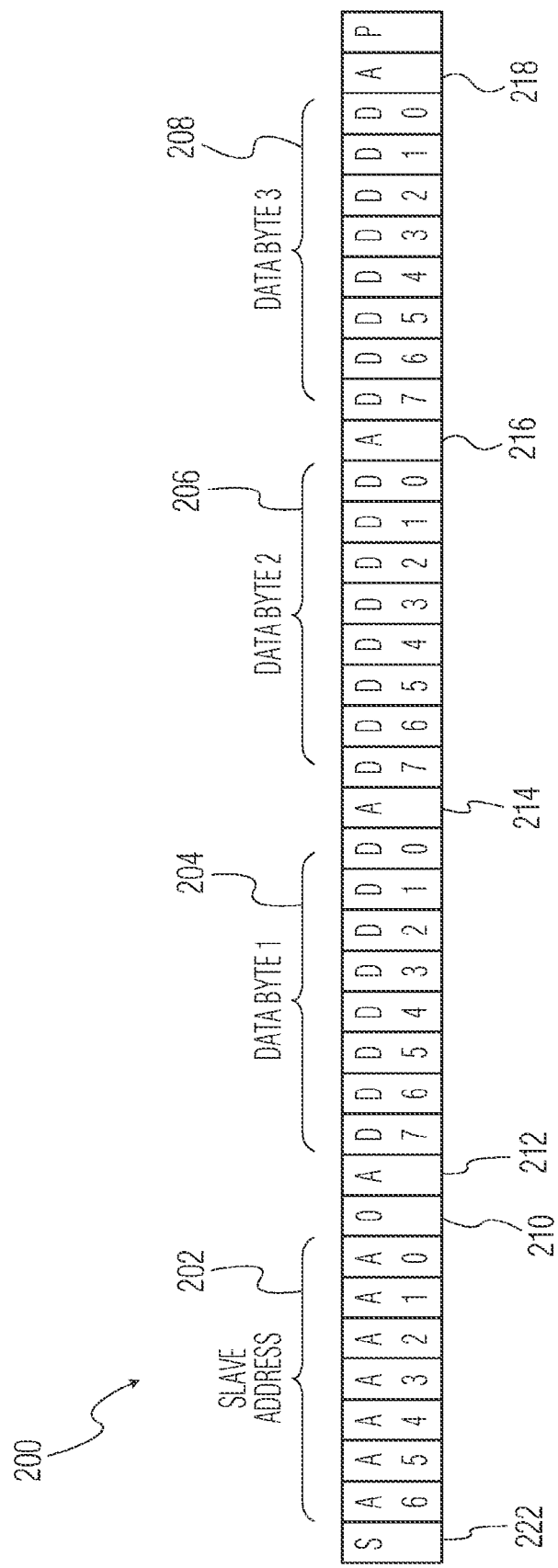
FIG. 2 is an illustration of a data stream for a data communications system implementing programming of parallel slave devices concurrently using an I2C serial bus in accordance with embodiments of the present invention.

FIG. 2 is an illustration of a serial data stream 200 for a data communications system implementing programming of parallel slave devices concurrently using an I2C serial bus in accordance with embodiments of the present invention. The serial data stream 200 is illustrated in FIG. 2 consistent with an I2C communications protocol. An ALL CALL address 202 follows a START condition 222 transmitted by a master on an I2C bus. The ALL CALL address 202 is followed by a READ/WRITE bit 210, and a subsequent ACKNOWLEDGE signal 212 from all slave devices that recognize the ALL CALL address 202. The READ/WRITE signal 210 is illustrated in FIG. 2 as a logic 0, indicating a write from the master to the slave. A first data byte 204, second data byte 206, and a third data byte 208 are transmitted by the master device, each data byte 204, 206, 208 followed by a respective ACKNOWLEDGE 214, 216, 218 from any slave device that recognizes the ALL CALL address 202. In this manner, all slave devices that recognize the ALL CALL address 202 are programmed in parallel with the data bytes 204, 206, 208.

Figure 3:
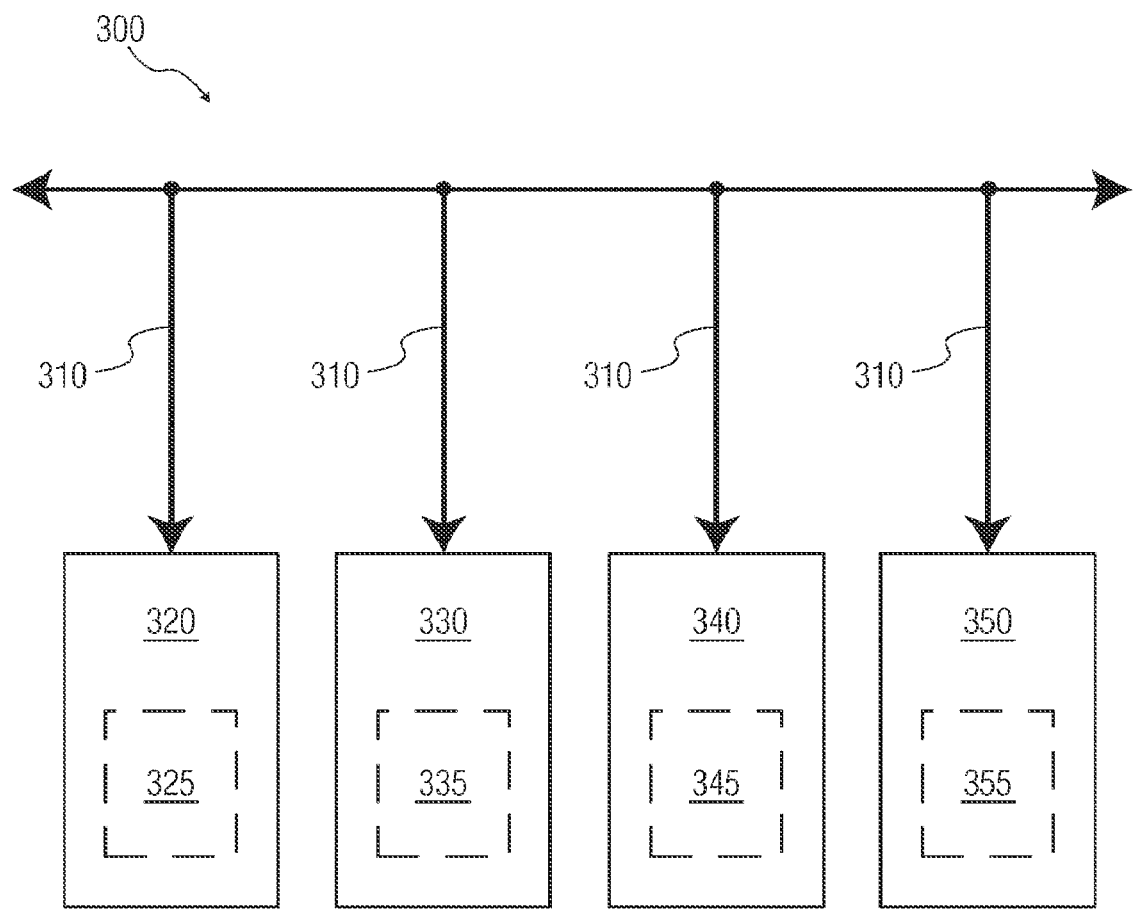
FIG. 3 is a block diagram of a system implementing programming of parallel slave devices concurrently using an I2C serial bus in accordance with embodiments of the present invention.

FIG. 3 is a block diagram of a system 300 implementing programming of parallel slave devices concurrently using an I2C serial bus in accordance with embodiments of the present invention. Slave devices 320, 330, 340 and 350 are connected to an I2C bus 310. The slave devices 320, 330, 340 and 350 are illustrated in FIG. 3 as GPIO devices for purposes of illustration, but not limitation. The slave devices 320, 330, 340 and 350 may include a configuration register 325, 335, 345, and 355 respectively to direct and/or control the assembly and flow of data to and/or from the I2C bus 310.

In one specific example, slave devices 320, 330, and 340 may be programmed to recognize a particular ALL CALL address, and slave device 350 may not be programmed to recognize the particular ALL CALL address. If the particular ALL CALL address is placed on the I2C bus 310, the slave devices 320, 330, and 340 will load the data following the particular ALL CALL address, whereas the slave device 350 will not load the data following the particular ALL CALL address.

Figure 4:
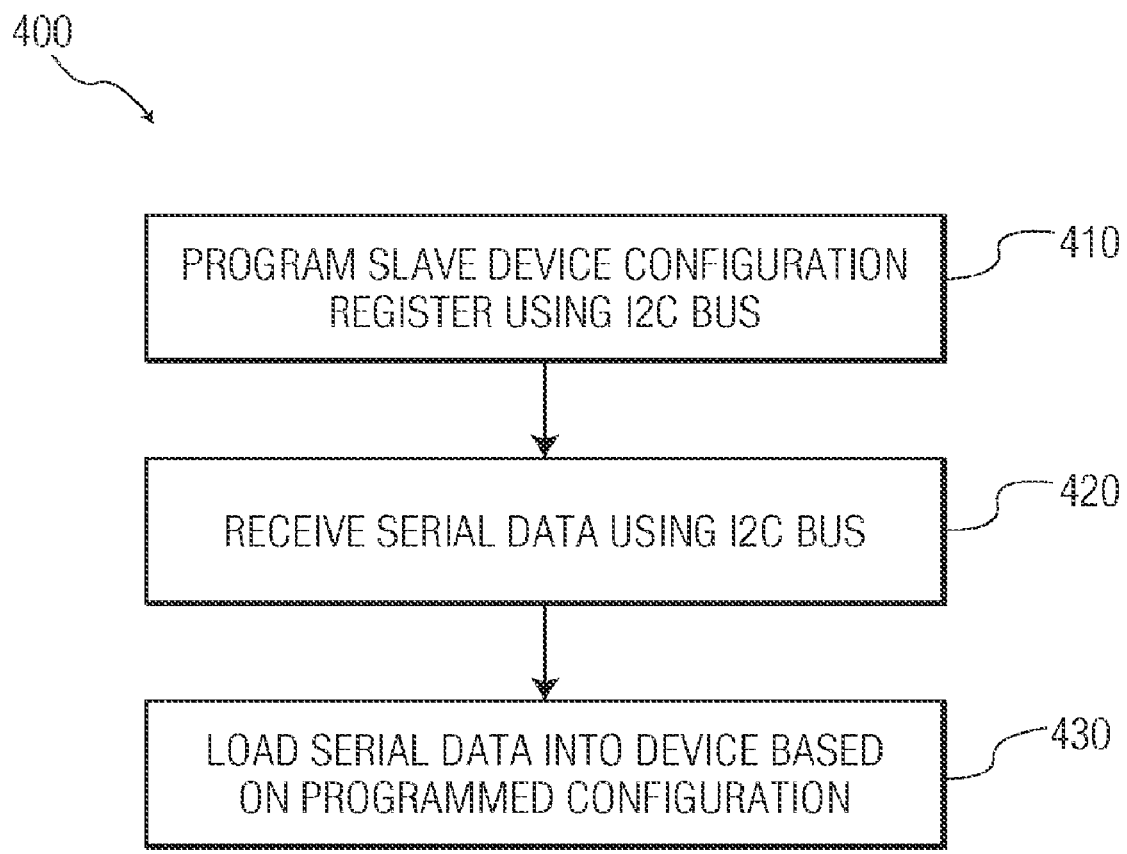
FIG. 4 is a flow chart of a method for implementing programming of parallel slave devices concurrently using an I2C serial bus in accordance with embodiments of the present invention.

FIG. 4 is a flow chart of a method 400 for implementing programming of parallel slave devices concurrently using an I2C serial bus in accordance with embodiments of the present invention. The method 400 involves a group of slave devices, such as a GPIO devices, updating, either one at a time, or in parallel, based on the slave device configuration selected by a programmable configuration register.

The method involves programming 410 the slave device for a particular configuration, such as by using a configuration register in the slave device or such as by writing a particular address recognized by the slave device, for example. The programming may be performed using an I2C communications protocol, to designate whether the slave device updates sequentially or updates in parallel relative to other slave devices on the I2C bus. Serial data is received 420 using a serial data transfer bus, such as an I2C bus, by every slave device on the bus. The selected or configured slave devices load 430 the data, updating either one at a time or in parallel relative to other slave devices, based on the programming 410. The use of a GPIO device as the slave device implementing the method 400 is for purposes of illustration only, and not for limitation.

Hardware, firmware, software or a combination thereof may be used to perform the various embodiments of programming parallel slave devices concurrently using an I2C serial bus as described herein. The master device functionality used in connection with the invention may reside in an I2C master device as described, or may alternatively reside on a standalone or networked computer attached to the serial data communications system 100. The serial data communications system 100 illustrated in FIG. 1 is an example structure that can be used in connection with such communications systems, computers, or other computer-implemented devices to carry out operations of the present invention.

The example master device 130 illustrated in FIG. 1, suitable for performing the programming in accordance with the present invention, typically includes a central processor (CPU) coupled to random access memory (RAM) and/or some variation of read-only memory (ROM). The ROM may also be other types of storage media to store programs, such as programmable ROM (PROM), erasable PROM (EPROM), etc. The processor may communicate with other internal and external components through input/output (I/O) circuitry and/or other bussing, to provide control signals, communication signals, and the like.

The master device 130 may also include one or more data storage devices, including hard and floppy disk drives, CD-ROM drives, and other hardware capable of reading and/or storing information, such as DVD, etc. In one embodiment, software for carrying out embodiments of programming parallel slave devices concurrently using an I2C serial bus in accordance with the present invention may be stored and distributed on a CD-ROM, diskette, or other form of media capable of portably storing information. These storage media may be inserted into, and read by, devices such as a CD-ROM drive, the disk drive, etc. The software may also be transmitted to the computing arrangement via data signals, such as being downloaded electronically via a network, such as the Internet. Further, as previously described, the software for carrying out the functions associated with the present invention may alternatively be stored in internal memory/storage of the computing device, such as in the ROM.

Any resulting program(s), having computer-readable program code, may be embodied within one or more computer-usable media such as memory devices or transmitting devices, thereby making a computer program product or article of manufacture according to the invention. As such, the terms "computer readable medium," "article of manufacture," "computer program product" or other similar language as used herein are intended to encompass a computer program which exists permanently, temporarily, or transitorily on any computer-usable medium such as on any memory device or in any transmitting device.

Each feature disclosed in this specification (including any accompanying claims, abstract, and drawings), is replacable by alternative features having the same, equivalent or similar purpose, unless expressly stated otherwise. Thus, unless expressly stated otherwise, each feature disclosed is one example only of a generic series of equivalent or similar features.

The present invention should not be considered limited to the particular examples described above. Various modifications, equivalent processes, as well as numerous structures to which the present invention may be applicable fall within the scope of the present invention. For example, embodiments in accordance with the present invention can be implemented using a similarly constructed one-way or two-way interface for communication between devices on a common bus, such as an SMBus or other bus arrangement. Such variations may be considered as part of the claimed invention, as fairly set forth in the appended claims.

What is claimed is:

1. A communications system for transferring data on a serial data transfer bus having a serial data line and a clock line that implement a communications protocol, the system comprising:
   at least two slave devices coupled in parallel on the data transfer bus and configured to load serial data over the serial data line using the communications protocol, each slave device configured to be programmed, using the communications protocol, with programming data that when implemented by the slave devices causes each of the slave devices to either load the serial data in parallel with the other slave devices, or load the serial data one at a time relative to the other of the at least two slave devices.

2. The system of claim 1, comprising at least three slave devices coupled in parallel and configured to load the serial data, wherein each of the slave devices includes a programmable configuration register configured to be programmed to individually configure each of the at least three slave devices to load the serial data individually in one configuration, and in parallel relative to other slave devices in another configuration, based on the programmed configuration register.

3. The system of claim 1, wherein the at least two slave devices are configured to load the serial data in parallel by simultaneously loading the serial data.

4. The system of claim 1, wherein the at least two slave devices are configured to load the serial data in parallel by concurrently loading the serial data.

5. The system of claim 1, wherein the at least two slave devices are configured to load the serial data one at a time by not concurrently loading the serial data.

6. The system of claim 1, wherein at least one of the slave devices is configured as a general purpose Input/Output device.

7. The system of claim 1, wherein the at least two slave devices are configured to conform to an SMBus serial communication protocol.

8. The system of claim 1, wherein each of the slave devices include a programmable configuration register that is configured with the programming data using an address reserved for designating an ALL CALL protocol, and the slave devices load the serial data in accordance with the programming data in the configuration register.

9. In a communications system using an I2C serial data transfer bus that has a serial data line and a clock line used to implement a communications protocol, a method for a master device to load data into at least two slave devices, comprising:

programming a configuration register in each slave device, using the communications protocol over the I2C serial data transfer bus, in accordance with a selected one of a plurality of selectable slave device configurations, wherein one of the plurality of selectable slave device configurations causes the at least two slave devices to load data provided on the serial data transfer bus in parallel and another of the plurality of selectable slave device configurations causes the at least two slave devices to load data provided on the serial data transfer bus one at a time; and in each of the slave devices, loading the data into the at least two slave devices based on the selected configuration.

10. The method of claim 9, wherein the serial data transfer bus further conforms to an SMBus serial communication specification.

11. The method of claim 9, wherein the at least two slave devices are configured as a general purpose Input/Output device.

12. The method of claim 9, wherein programming the configuration register in each slave device comprises writing an address reserved for designating an ALL CALL protocol into the slave device.

13. The method of claim 9, wherein loading the data into the at least two slave devices based on the selected configuration comprises, in at least two of the slave devices, loading data in parallel and, in another one of the slave devices, loading data sequentially relative to the at least two of the slave devices.

14. A computer-readable storage medium having computer-executable instructions for a master device to write into at least two slave devices, the computer-executable instructions performing steps comprising:

programming a configuration register in each slave device, using an I2C communications protocol, with a selected one of a plurality of selectable slave device configurations, wherein one of the plurality of selectable slave device configurations causes the at least two slave devices to load data provided on the serial data transfer bus in parallel and another of the plurality of selectable slave device configurations causes the at least two slave devices to load data provided on the serial data transfer bus one at a time.

15. The computer-readable storage medium of claim 14, wherein the computer-executable instructions conform to an SMBus serial communication protocol.

16. An I2C slave device coupled to an I2C bus for receiving serial data, the device comprising:

a load-designation element that designates whether the I2C slave device is to be loaded with the serial data individually or to be loaded with the serial data in parallel with other I2C devices coupled to the I2C bus; and a loader that loads serial data into the slave device, the slave device being loaded with the serial data either individually, or in parallel with the other I2C devices, based on the designation by the load-designation element.

17. The device of claim 16, wherein the load-designation element comprises a register that stores data for designating whether the I2C slave device is to be loaded with the serial data individually or to be loaded with the serial data in parallel with other I2C devices coupled to the I2C bus.

18. The device of claim 16, wherein the load-designation element comprises an I2C master device that programs the slave device to either load the serial data individually or in parallel with the other I2C devices.

19. The device of claim 16, wherein the loader comprises an I2C bus that provides the serial data to the slave device.

20. A communications system for transferring data on a serial data transfer bus having a serial data line and a clock line that implement a communications protocol, the system comprising:

at least two slave devices coupled in parallel on the data transfer bus;

a master device coupled to the data transfer bus and configured to selectively program the at least two slave devices to load serial data over the serial data line by loading the serial data in parallel with another of the at least two slave devices, or loading the serial data one at a time, relative to the other of the at least two slave devices; and each of the slave devices being configured to load the serial data either in parallel or one at a time based upon the selective programming by the master.

21. The communications system of claim 20, wherein the master device is configured to selectively program the at least two slave devices to load the serial data in parallel with another of the at least two slave devices by programming a register for each of the devices with programming data that, when implemented by the slave device, causes the slave device to load the serial data in parallel with another of the at least two slave devices, and load the serial data one at a time, relative to the other of the at least two slave devices, by programming a register for each of the devices with programming data that, when implemented by the slave device, causes the slave device to load the serial data one at a time, relative to the other of the at least two slave devices.

22. The communications system of claim 20, wherein the master device is configured to selectively program the at least two slave devices to load the serial data in parallel with another of the at least two slave devices by communicating programming data and an address for each slave device over the data transfer bus that, when implemented by the addressed slave device, causes the slave device to load the serial data in parallel with another of the at least two slave devices, and load the serial data one at a time, relative to the other of the at least two slave devices, by communicating programming data and an address for each slave device over the data transfer bus that, when implemented by the addressed slave device, causes the slave device to load the serial data one at a time, relative to the other of the at least two slave devices.

23. The communications system of claim 20, wherein the master device is configured to selectively program the at least two slave devices by addressing less than all of the slave devices coupled to the serial data transfer bus, in response to an acknowledge communication from the addressed slave devices, communicating programming data to the addressed slave devices to configure all of the addressed slave devices either to load the serial data in parallel, or to load the serial data one at a time.

* * * * *